United States Patent

Niedermair et al.

(10) Patent No.: US 6,381,574 B1
(45) Date of Patent: Apr. 30, 2002

(54) DEVICE FOR REPRODUCING INFORMATION OR EXECUTING FUNCTIONS

(75) Inventors: Gerhard Niedermair, Vierkirchen; Luc De Vos, München; Jürgen Jacob, München; Lucas Neubauer, München, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/663,590

(22) Filed: Sep. 18, 2000

Related U.S. Application Data

(63) Continuation of application No. PCT/DE99/00511, filed on Feb. 25, 1999.

(30) Foreign Application Priority Data

Mar. 18, 1998 (DE) .......................... 198 11 832

(51) Int. Cl.[7] .................... G09B 9/04; G10L 15/28
(52) U.S. Cl. ...................... 704/275; 379/88.02
(58) Field of Search ............... 704/246, 251, 704/270, 275; 379/88.02

(56) References Cited

U.S. PATENT DOCUMENTS

| | | | | |
|---|---|---|---|---|
| 4,569,026 A | | 2/1986 | Best ........................ 345/247 |
| 4,827,518 A | * | 5/1989 | Feustel et al. ............... 704/246 |
| 5,056,145 A | * | 10/1991 | Yamamoto et al. ......... 704/270 |
| 5,420,912 A | * | 5/1995 | Kopp et al. ................. 455/563 |
| 5,499,288 A | * | 3/1996 | Hunt et al. ................. 379/88.02 |
| 5,566,229 A | * | 10/1996 | Hou et al. ................. 379/88.02 |
| 5,583,933 A | * | 12/1996 | Mark ......................... 379/355 |
| 5,774,841 A | * | 6/1998 | Salazar et al. ............... 704/225 |
| 5,895,447 A | * | 4/1999 | Ittycheriah et al. ......... 704/231 |
| 6,107,935 A | * | 8/2000 | Comerford et al. ........ 340/5.52 |
| 6,246,987 B1 | * | 6/2001 | Fisher et al. ............... 704/273 |

FOREIGN PATENT DOCUMENTS

| DE | 196 17 129 A1 | 10/1997 | ............ A63H/3/36 |
|---|---|---|---|
| DE | 196 17 132 A1 | 10/1997 | ............ A63H/3/36 |

* cited by examiner

Primary Examiner—Richemond Dorvil
Assistant Examiner—Donald L. Storm
(74) Attorney, Agent, or Firm—Herbert L. Lerner; Laurence A. Greenberg; Werner H. Stemer

(57) ABSTRACT

A device for reproducing information or executing functions in which first data, which represent information to be reproduced or functions to be executed, and second data, which assist the voice recognition, are realized on the same physical storage medium, which can be easily exchanged by a user. The device serves especially for bidirectional acoustic communication for entertainment and/or education purposes. Multimedia smart cards are especially intended as the storage medium.

7 Claims, 1 Drawing Sheet

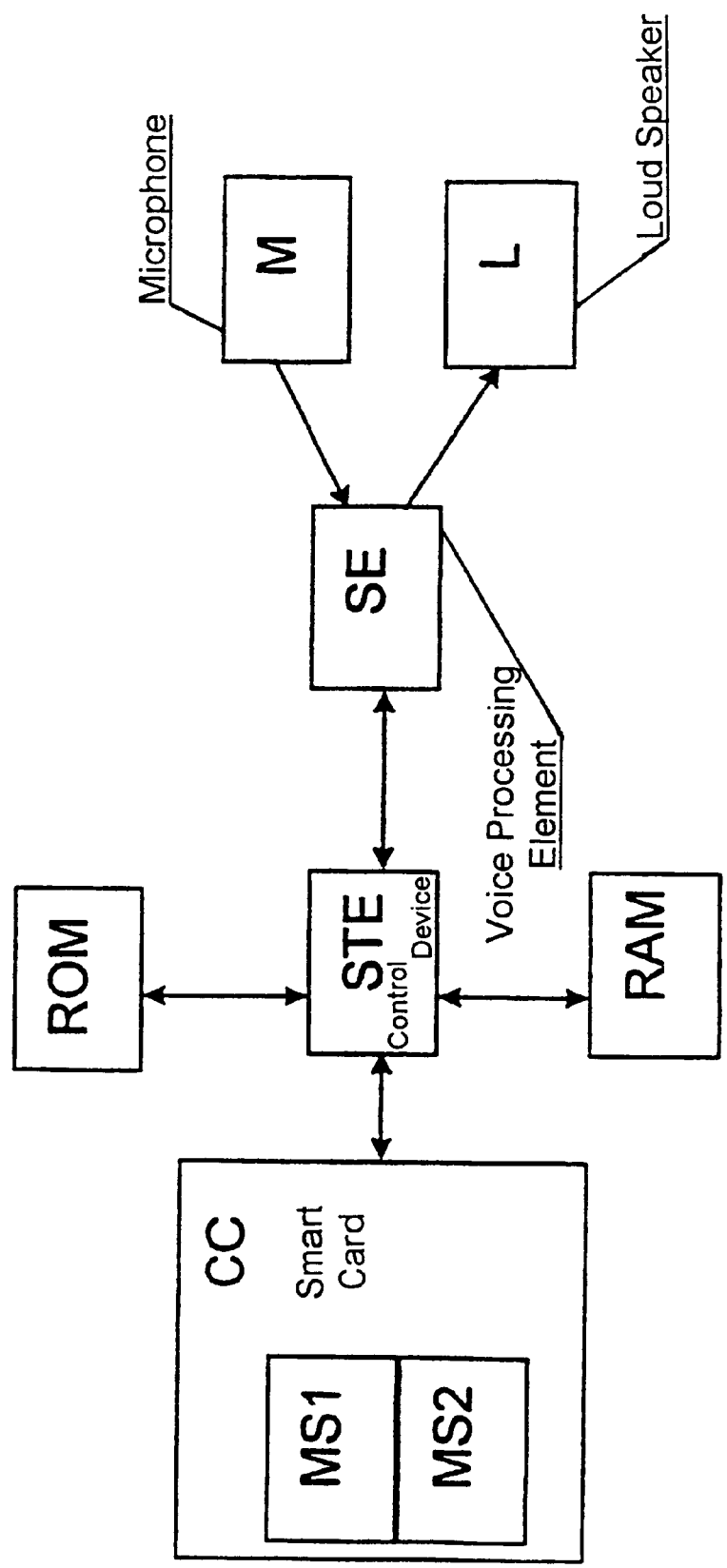

DEVICE FOR REPRODUCING INFORMATION OR EXECUTING FUNCTIONS

CROSS-REFERENCE TO RELATED APPLICATION

This is a continuation of copending International Application PCT/DE99/00511, filed Feb. 25, 1999, which designated the United States.

BACKGROUND OF THE INVENTION

Field of the Invention

The invention relates to a device for reproducing information or executing functions, especially for bidirectional acoustic communication.

Although previously known devices for education and/or entertainment purposes use acoustic communication, it is only in one direction. For instance, although a cassette device outputs acoustic information, control of the cassette device takes place by use of buttons. Although portable computer games output acoustic and/or visual information, they are likewise operated by an input of keypad commands.

Devices with acoustic reproduction and exchangeable storage media which can be controlled by voice input have so far not been feasible on account of the large amount of memory space required for this.

SUMMARY OF THE INVENTION

It is accordingly an object of the invention to provide a device for reproducing information or executing functions which overcomes the above-mentioned disadvantages of the prior art devices of this general type, which allows in the most convenient way possible the reproduction of information stored on exchangeable storage media.

With the foregoing and other objects in view there is provided, in accordance with the invention, a device for reproducing information and executing functions. The device contains a voice recognition device having a controller for controlling the device by spoken control information. A physical storage medium removably connected to the voice recognition device is provided such that the physical storage medium is exchangeable by a user. The physical storage medium has a first storage device for storing first data representing information to be reproduced and the functions to be executed and a second storage device for storing second data representing comparison control information. The second data being adapted speaker-independently to a target group being specific for said first data.

The invention is accordingly based on the idea of storing first data, which represent the information to be reproduced or the functions to be executed, and second data, which assist voice recognition, on a single physical storage medium, which can be easily exchanged by a user.

In a development of the invention, depending on the first data last output, specific second data are selected and used for assisting in the voice recognition. As a result, the voice recognition is facilitated.

In another development of the invention, the second data for assisting in the voice recognition are adapted to a target group that is specific for the first data. As a result, the memory space requirement is reduced, and the voice recognition is facilitated. Reproducing the second data available also has the effect of facilitating the voice recognition.

The invention is especially suitable for use in portable devices in which storage media such as smart cards, which are small, lightweight, robust with respect to vibrations and consume little energy, are preferably used.

In accordance with an added feature of the invention, the first data contain information on the second data.

In accordance with an additional feature of the invention, the first storage device, the second storage device and the physical storage medium form a smart card, and optionally data can only be read from the smart card.

In accordance with another feature of the invention, the first data and the second data substantially contain acoustic information and the device is used for bidirectional acoustic communication.

In accordance with a concomitant feature of the invention, at least one of the first data and the second data are stored in a compressed form on the physical storage medium, and can be selectively decompressed in the controller.

Other features which are considered as characteristic for the invention are set forth in the appended claims.

Although the invention is illustrated and described herein as embodied in a device for reproducing information or executing functions, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

The single FIGURE of the drawing is block diagram of a device for reproducing information or executing functions according to the invention.

DESCRIPTION OF THE PREFERRED EMBODIMENTS

Referring now to the single FIGURE of the drawing in detail, there is shown a portable device that has a loudspeaker device L for outputting acoustic information, a monitor for outputting visual information or other technical devices, such as control devices or processors, which can initiate or carry out a function as a response to information (first data).

In addition, the device contains a microphone element M for picking up acoustic signals, especially spoken voice. These acoustic signals are further processed by a voice processing element SE, for example are subjected to an analog/digital conversion, and are transmitted to a control device STE. The control device STE and the voice processing element SE may be respectively formed as a microcontroller. The voice processing element SE provides voice recognition functions which are then processed by the control device STE.

The device has two permanently installed storage devices. These include a read-only memory ROM, in which an operating system and further data to be used for controlling the control device STE can be stored, and a random-access memory RAM, in which data arising or required during the operation of the device are buffer-stored. The two storage devices ROM, RAM are connected to the control device STE via a bus system.

A smart card CC can be exchangeably inserted into the device, and is then connected to the control device STE via a bus system. The smart card CC is preferably a read-only memory; however, the invention is not restricted to the use of read-only memories, but also covers the use of random-access memories. Two different types of data are stored on the smart card CC. First data, which represent the information to be reproduced or the functions to be executed, and second data, which represent the control information for controlling the output of the first data.

The function of the device is described below by way of example on the basis of an interactive storyteller. The storyteller reads out stories, for example to a child, or plays music.

The voice and music data (first data) of the story, which are stored on the smart card CC in a digital and compressed form, are decompressed by the control device STE and further processed in the voice processing element SE, for example are subjected to a digital/analog conversion, and are reproduced via the loudspeaker L.

At specific predetermined points (interaction points), the sequence is interrupted. The device asks the child a question by voice output concerning how to proceed, in that it outputs via the loudspeaker possibilities, or the control information corresponding to the possibilities, existing at this interaction point (for example: apple, plum or pear). The child can then answer this question by saying an item of control information (for example: pear).

The next step to be carried out is detected by voice recognition. The voice recognition is facilitated by all the possible next steps to be carried out, or the corresponding control information, likewise being stored on the smart card CC in a digital and compressed form.

For voice recognition, the items of spoken control information (for example: pear) undergo analog/digital conversion in a voice processing element SE and are compared in the control device STE with the items of control information available at this interaction point (second data). These items of control information (second data) are transferred from the smart card CC to the control device STE for comparison, and if appropriate are decompressed.

The item of spoken control information converted into digital data is compared by the control device STE with the items of control information available for selection, which are likewise in a digital form, and finally the command which corresponds to the item of control information most similar to the item of spoken control information is executed. Then, the data corresponding to this command are read from the smart card CC, decompressed, amplified by an amplifier and output via the loudspeaker L, and in this way the story continues to be related.

At each interaction point of this kind, the child operating the device for example is consequently requested to select from a number of possibilities. The selection of a possibility is carried out by the voice recognition which is based on a comparison with the selection possibilities. In this way, the child is led through the existing possibilities of the story, the child itself establishing which way through the existing parts of the story or pieces of music is chosen.

Consequently, operator control of the device essentially takes place acoustically. The device is merely provided with an on/off button and a button for controlling the reproduction volume.

By exchanging the smart card CC, a different story can be related, and the story can be controlled by data likewise stored on the smart card CC.

In a development of the invention, the voice of the children are recognized independently of the speaker for the intended vocabulary under selection. This can be further facilitated by the stored control information (second data) being adapted to the target group (children, national language) of the first data (story). The voice recognition is consequently facilitated or made more reliable by the control information stored on the smart card CC (second data) being based on the evaluation of spoken control information, this control information only being spoken by a representative selection of persons of the target group (children).

In a variant of the invention, it is also possible, instead of outputting acoustic information, to execute functions.

In this case, many different functions are conceivable: display of graphic symbols on a monitor, execution of game functions, execution of functions of a menu structure, execution of functions for initiating signaling procedures for setting up a communication link and carrying out functions for communication by a mobile radio transceiver. In this way it is possible for example to provide a smart card CC for mobile radio transceivers on which, on the one hand, the data of a menu structure for controlling the mobile radio transceiver are stored and, on the other hand, data for assisting the voice recognition for controlling the mobile radio transceiver are stored.

We claim:

1. An interactive device, comprising:

a voice recognition device having a controller controlling the interactive device by spoken control information and said voice recognition device reproducing information and executing functions; and a physical storage medium removably connected to said voice recognition device such that said physical storage medium is exchangeable by a user, said physical storage medium having a first storage device storing first data representing information to be reproduced and the functions to be executed and a second storage device storing second data representing comparison control information, said second data being adapted speaker-independently to a target group being specific for said first data.

2. The device as claimed in claim 1, wherein said second data are selected and used for assisting in voice recognition in dependence on said first data last output.

3. The device according to claim 1, wherein said first data contain information on said second data.

4. The device according to claim 1, wherein said first storage device, said second storage device and said physical storage medium form a smart card.

5. The device according to claim 1, wherein said first storage device, said second storage device and said physical storage medium form a smart card from which data can only be read.

6. The device according to claim 1, wherein said first data and said second data substantially contain acoustic information and the interactive device is used for bidirectional acoustic communication.

7. The device according to claim 1, wherein at least one of said first data and said second data are stored in a compressed form on said physical storage medium, and can be selectively decompressed in said controller.

* * * * *